(12) United States Patent
Chang

(10) Patent No.: US 6,382,543 B1
(45) Date of Patent: May 7, 2002

(54) SWING ARM DEVICE FOR FISHING REEL

(76) Inventor: Liang-Jen Chang, No. 23, Lane 184-15, Hsin-Ping Rd., Tai-Ping City, Taichung Hsien (TW)

( * ) Notice: Subject to any disclaimer, the term of this patent is extended or adjusted under 35 U.S.C. 154(b) by 0 days.

(21) Appl. No.: 09/851,482

(22) Filed: May 8, 2001

(51) Int. Cl.7 .............................................. A01K 89/01
(52) U.S. Cl. ......................... 242/249; 242/284; 74/547
(58) Field of Search ................................. 242/249, 282, 242/283, 284, 311; D22/140; 74/547

(56) References Cited

U.S. PATENT DOCUMENTS

| | | | | |
|---|---|---|---|---|
| 3,967,791 A | * | 7/1976 | Morishita | 242/284 |
| 4,196,867 A | * | 4/1980 | Miller | 242/249 |
| 4,332,358 A | * | 6/1982 | Neufeld | 242/282 |
| 4,369,930 A | * | 1/1983 | Noda | 242/282 |
| 5,540,397 A | * | 7/1996 | Yoshikawa | 242/311 |
| 5,690,289 A | * | 11/1997 | Takeuchi et al. | 242/282 |
| 6,102,315 A | * | 8/2000 | Sato | 242/249 |

* cited by examiner

Primary Examiner—Emmanuel M. Marcelo
(74) Attorney, Agent, or Firm—Ostrolenk, Faber, Gerb & Soffen, LLP

(57) ABSTRACT

A fishing reel includes a reel body, a main shaft, a spool, a driving tube, and a swing arm device. The swing arm device includes a swing arm, a driving shaft journalled in the body, and a sleeve unit journalled on the body and disposed around the driving shaft. Each of the driving shaft and the sleeve unit has an end that is coupled to and that is rotatable with the swing arm. The driving shaft has a polygonal cross-section, and extends into a polygonal-cross-sectioned hole in the driving tube. The driving tube has an end surface, which is formed with several tongues that engage respectively and fittingly several grooves in the sleeve unit, thereby transferring smoothly the rotation of the driving shaft to the driving tube.

5 Claims, 7 Drawing Sheets

SWING ARM DEVICE FOR FISHING REEL

BACKGROUND OF THE INVENTION

1. Field of the Invention

This invention relates to a fishing reel, more particularly to a swing arm device for a fishing reel, which can be operated smoothly.

2. Description of the Related Art

Referring to FIGS. 1 and 2, a conventional fishing reel is shown to include a reel body 11, a main shaft 12, a spool 13, a swing arm device 20, and a driving tube 30. The driving tube 30 is provided with a fixed bevel gear 31 that engages a threaded end portion 121 of the main shaft 12 so as to transfer the rotation of the driving tube 30 to the main shaft 12 and subsequently to the spool 13. The swing arm device 20 includes a swing arm 21, a sleeve 22, a driving shaft 23, and a bolt 24. The sleeve 22 is sleeved fixedly on the driving shaft 23. The driving shaft 23 has a hexagonal cross-section, and is engaged within a hexagonal cross-sectioned hole in the driving tube 30, thereby permitting synchronous rotation of the driving shaft 23 and the driving tube 30. The bolt 24 retains the driving shaft 23 on the body 11. As such, the rotation of the swing arm 21 can be transferred to the spool 13. However, because clearance is inevitably present between the driving shaft 23 and the driving tube 30, when the swing arm 21 is actuated, the driving shaft 23 moves radially within the driving tube 30, thereby resulting in unsmooth operation of the swing arm 20.

SUMMARY OF THE INVENTION

An object of this invention is to provide a fishing reel with an improved swing arm device, which can be operated smoothly.

According to this invention, a fishing reel includes a reel body, a main shaft, a spool, a driving tube, and a swing arm device. The swing arm device includes a swing arm, a driving shaft journalled in the body, and a sleeve unit journalled on the body and disposed around the driving shaft. Each of the driving shaft and the sleeve unit has an end that is coupled to and that is rotatable with the swing arm. The driving shaft has a polygonal cross-section, and extends into a polygonal-cross-sectioned hole in the driving tube. The driving tube has an end surface, which is formed with several tongues that engage respectively and fittingly several grooves in the sleeve unit, thereby transferring smoothly the rotation of the driving shaft to the driving tube.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Figure 1:
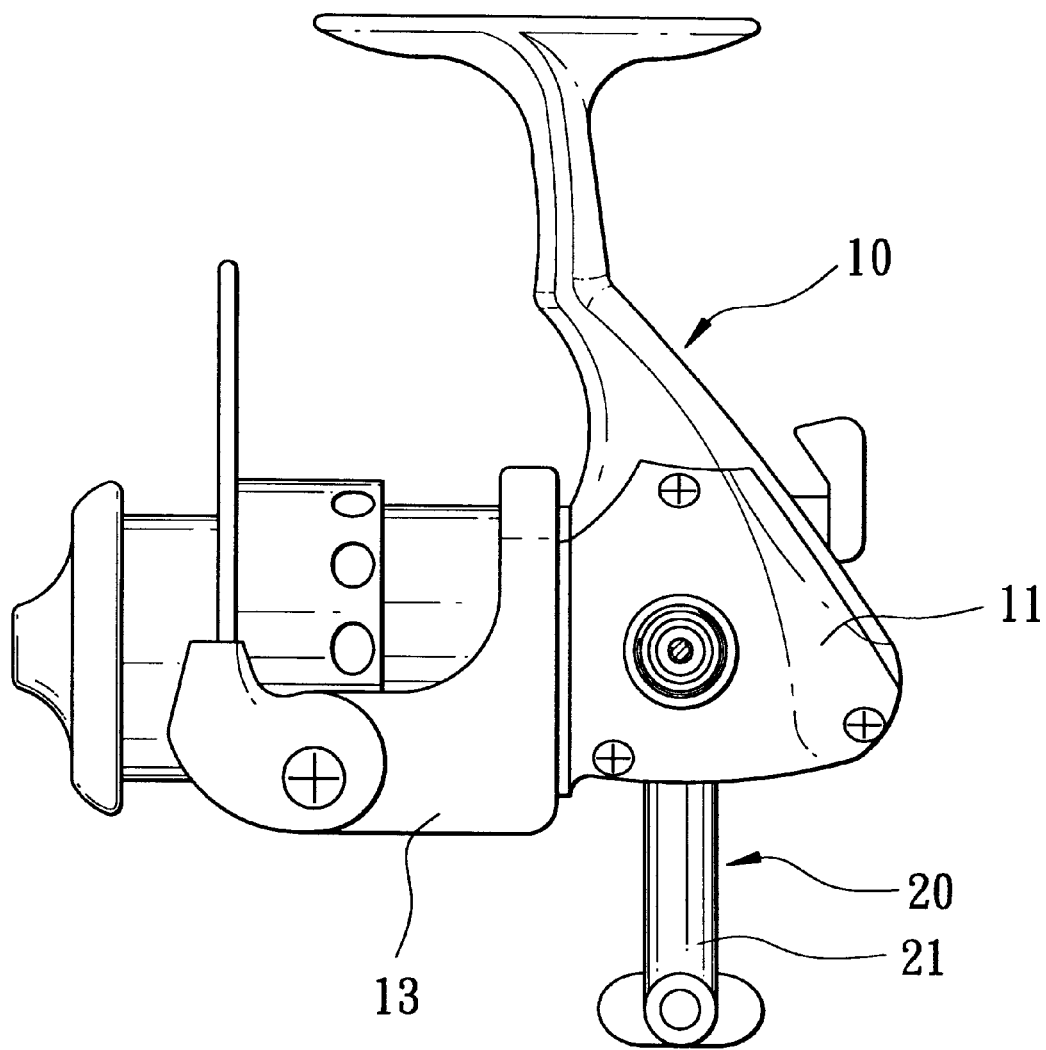
FIG. 1 is a schematic view of a conventional fishing reel.
Figure 2:
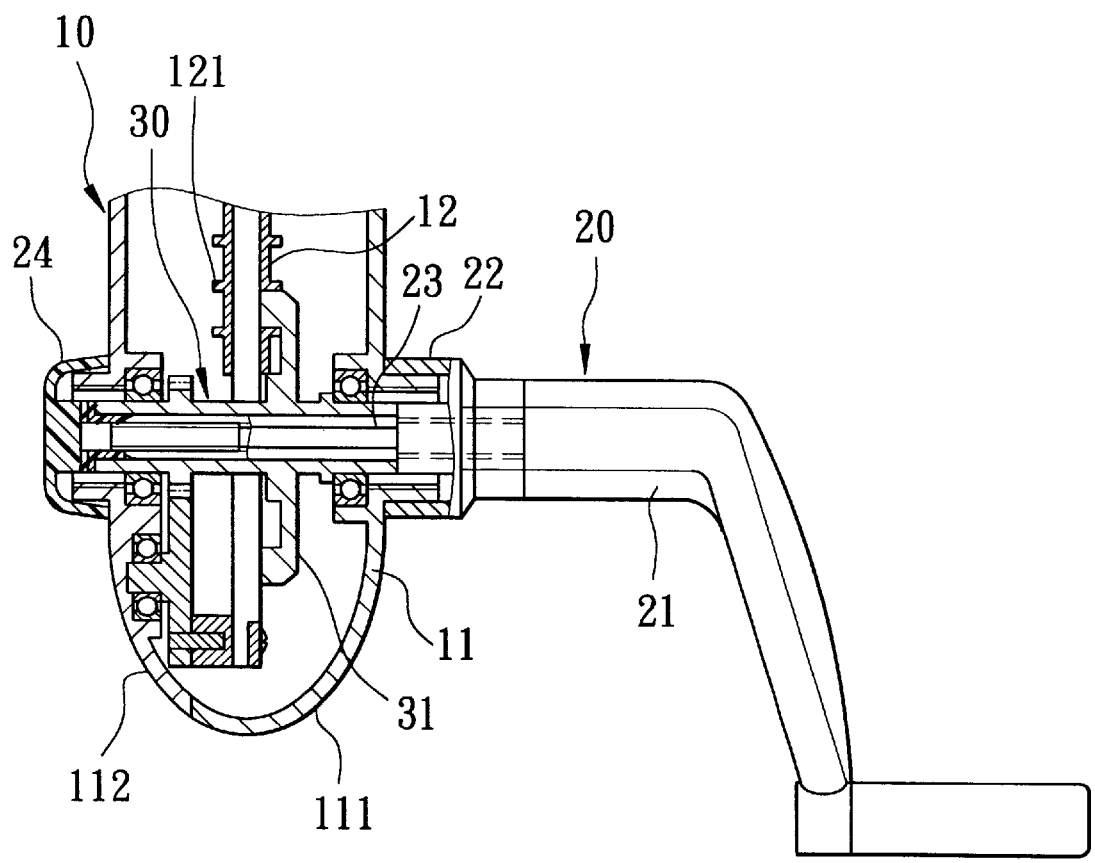
FIG. 2 is a sectional view illustrating how a swing arm device is incorporated in the conventional fishing reel.
Figure 3:
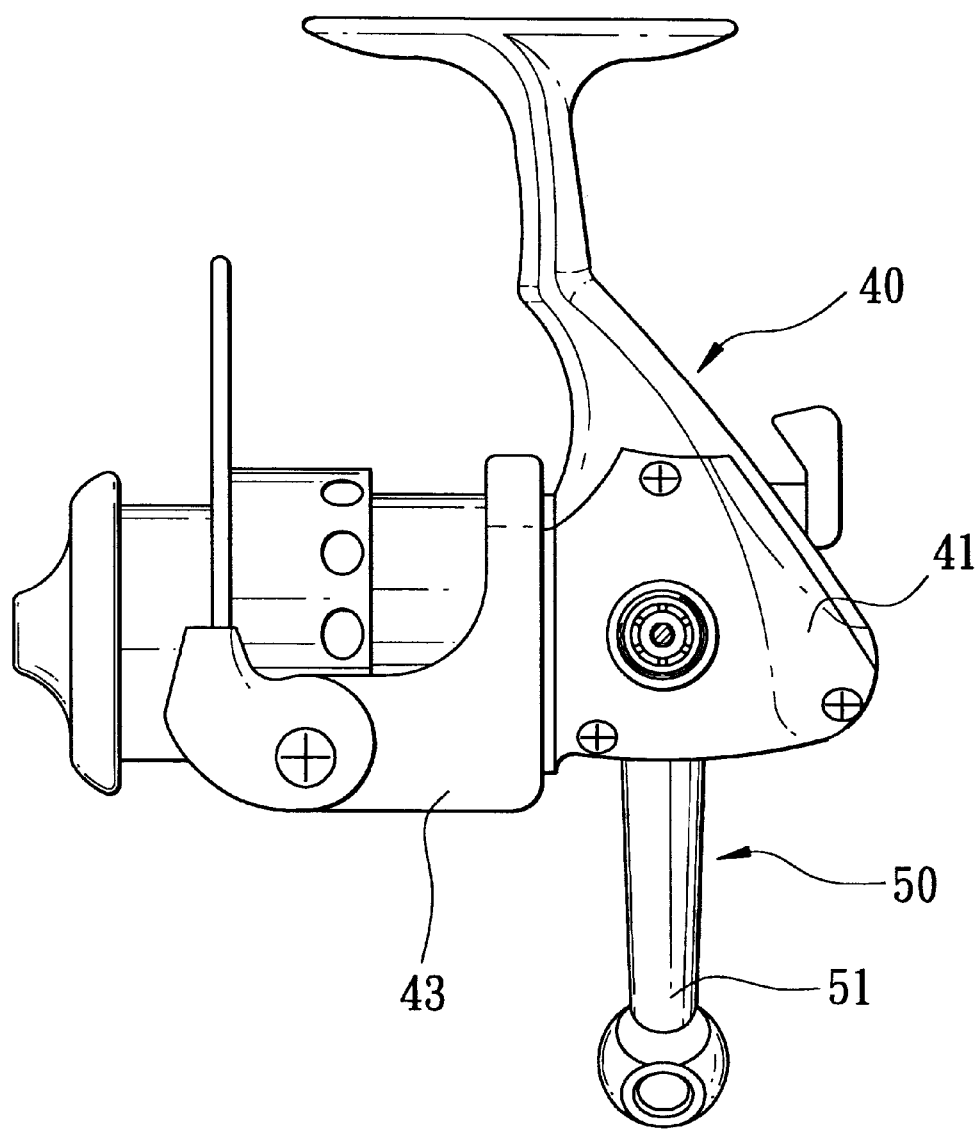
FIG. 3 is a schematic view of a first preferred embodiment of a fishing reel according to this invention.
Figure 4:
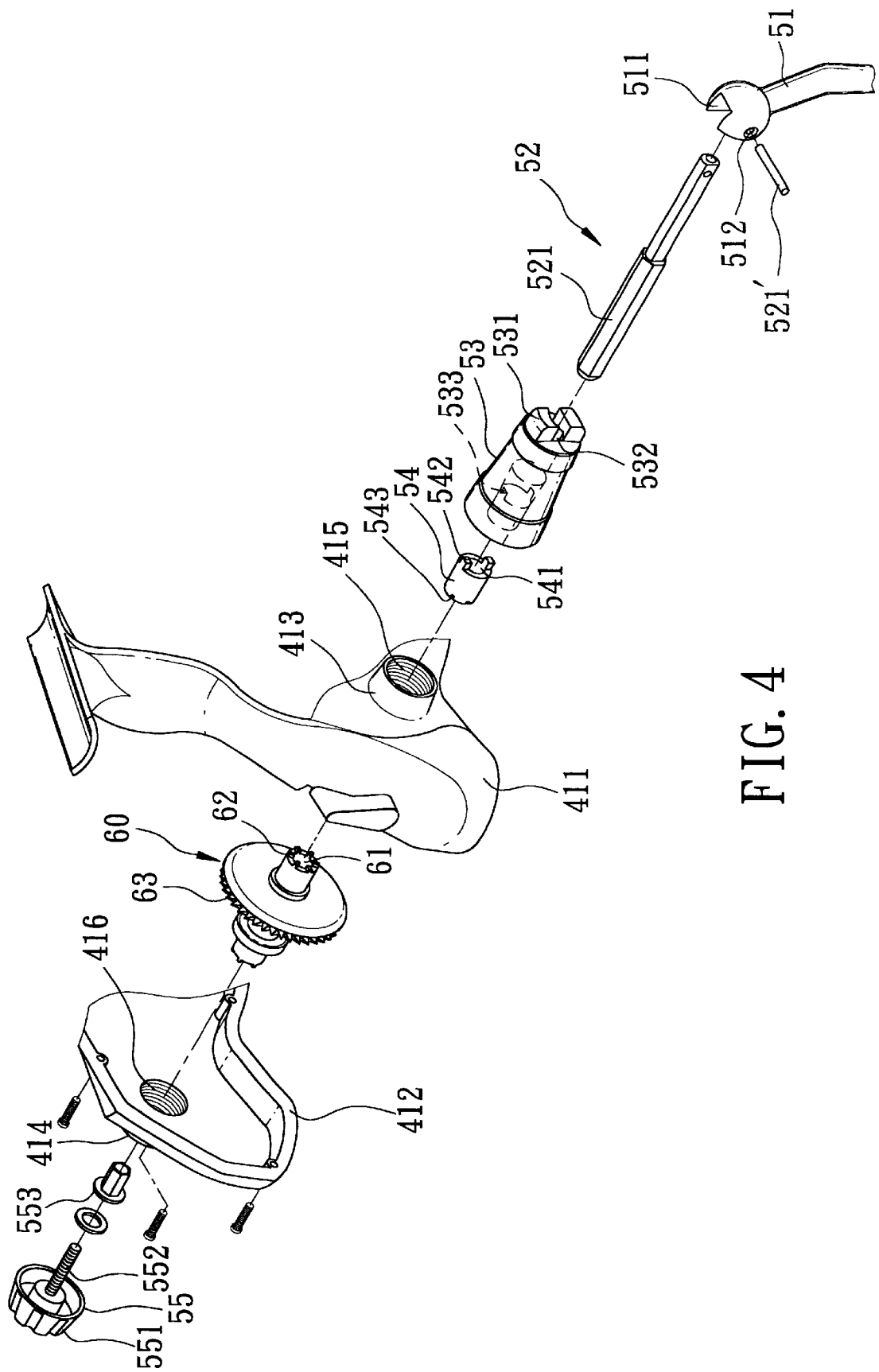
FIG. 4 is an exploded view of a portion of the first preferred embodiment.
Figure 5:
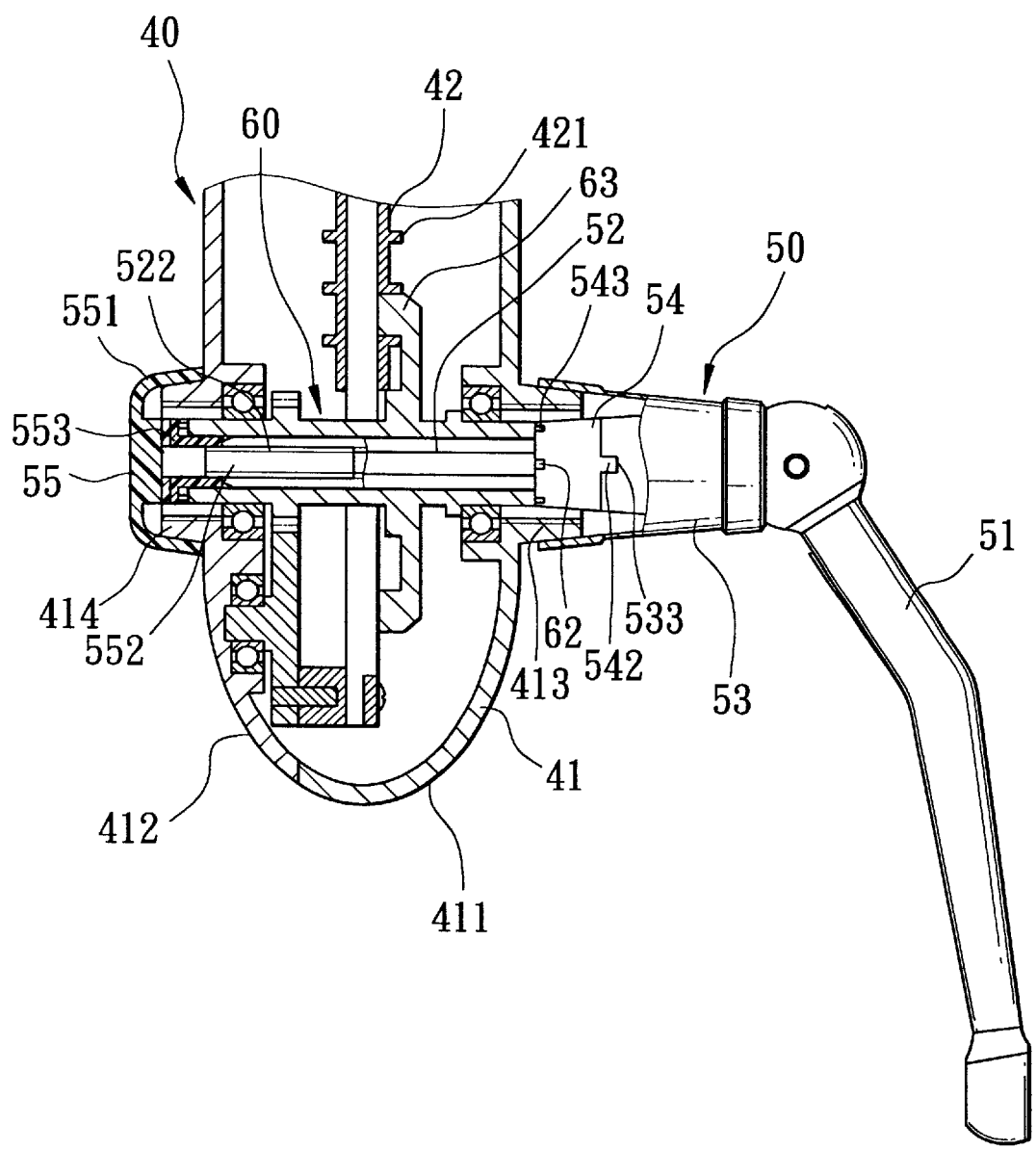
FIG. 5 is a sectional view illustrating how a swing arm device is incorporated in the first embodiment.

Referring to FIGS. 3, 4, and 5, a first preferred embodiment of a fishing reel 40 according to this invention is shown to include a reel body 41, a main shaft 42, a spool 43, a swing arm device 50, and a driving tube 60 that extends perpendicular to the main shaft 42. The driving tube 60 is provided with a fixed bevel gear 63 that engages a threaded end portion 421 of the main shaft 42 so as to transfer the rotation of the driving tube 60 to the main shaft 42 and subsequently to the spool 43. The swing arm device 50 includes a swing arm 51, a driving shaft 52, a sleeve unit consisting of a sleeve 53 and a coupling tube 54, and a bolt 55. The driving shaft 52 has a hexagonal-cross-sectioned shaft portion 521 that engages fittingly a hexagonal cross-sectioned hole 61 in the driving tube 60 in a known manner, thereby permitting synchronous rotation of the driving shaft 52 and the driving tube 60. The bolt 55 retains the driving shaft 52 on the body 41.

The body 41 includes a right housing 411, a left housing 412 that is bolted to the right housing 411, a right support tube 413 that extends outwardly and integrally from the right housing 411, and a left support tube 414 that extends integrally from the left housing 412 and away from the right support tube 413. A central hole 415 is formed through the right support tube 413 and the right housing 411, while another central hole 416 is formed through the left support tube 414 and the left housing 412.

The swing arm 51 has an end that is formed with a slot 511. The driving shaft 52 has an outer end that extends into the slot 511 in the swing arm 51, and is connected rotatably to the swing arm 51 by means of a pivot pin 521'.

The sleeve 53 is disposed around the driving shaft 52, and has an outer end surface, which is formed integrally with two diametrically opposed projections 531 that are located on two sides of a central hole 532. Because an assembly of the projections 531 of the sleeve 53 and the outer end of the driving shaft 52 is received fittingly within the slot 511 in the swing arm 51, the sleeve 53 rotates synchronously with the swing arm 51 when the swing arm 51 rotates about the driving shaft 52.

The coupling tube 54 has a central hole 541, an outer end surface which is formed with two diametrically opposed projections 542, and an inner end surface which is formed with six angularly equidistant grooves 543 that engage respectively and fittingly six tongues 62 of the outer end surface of the driving tube 60, thereby facilitating transfer of the rotation of the driving shaft 52 to the driving tube 60. The coupling tube 54 is received within and is complementary to a recess unit 533 in the sleeve 53 so as to be clamped between the sleeve 53 and the driving tube 60, thereby preventing relative rotation between the sleeve 53 and the coupling tube 54.

The driving tube 60 is disposed between the left housing 412 and the right housing 411. The left support tube 413 is received fittingly within the inner end of the sleeve 53, and is constructed as a truncated cone, which has an inner end that is formed on the right housing 411, an outer end, and an outer diameter that reduces gradually from the inner end to the outer end. The driving shaft 52 extends through the sleeve 53, the coupling tube 54, the central hole 415 in the right support tube 413 and the right housing 411, the driving tube 60, and the central hole 416 in the left housing 412 and the left support tube 414. The bolt 55 includes a rotary knob 551 that is sleeved rotatably on the left support tube 414, and a threaded rod 552 that is fixed to the knob 551 and that extends through a plastic tube 553 to engage a threaded hole 522 in an inner end surface of the driving shaft 52. As such, the driving shaft 52 is retained on the body 41.

Figure 6:
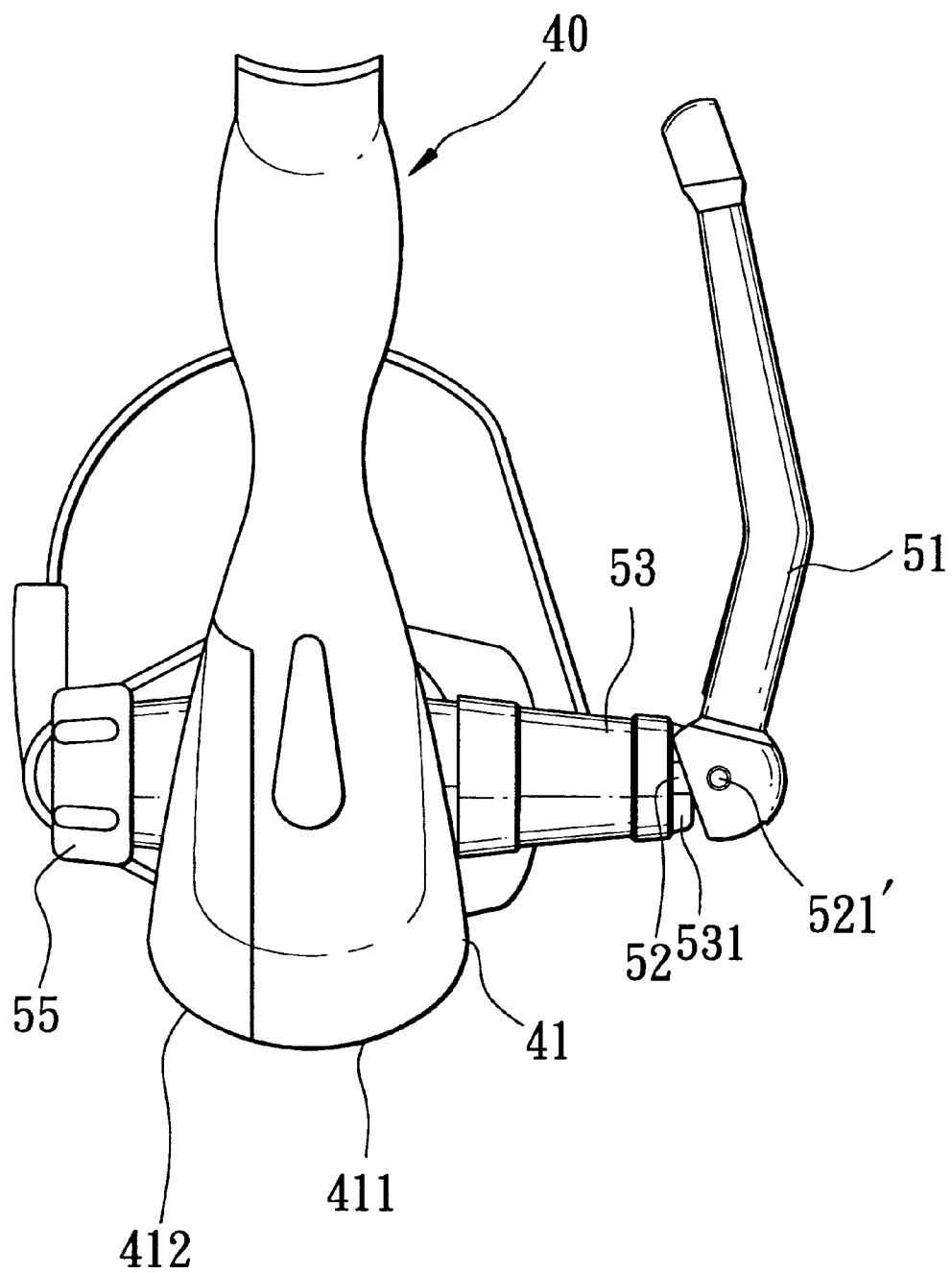
FIG. 6 is a schematic view of the first preferred embodiment, illustrating how a swing arm is turned to a folded position.

When the fishing reel 40 is not in use, the bolt 55 can be somewhat loosened from the driving shaft 52 so as to enable movement of the driving shaft 52 relative to the body 41, thereby permitting rotation of the swing arm 51 about the pivot pin 521' to a folded position, as shown in FIG. 6.

Accordingly, the rotation of the swing arm 51 about the driving shaft 52 can be transferred smoothly to the driving tube 60 by the engagements between the driving shaft 52 and the hole 61 in the driving tube 60 and between the tongues 62 of the driving tube 60 and the grooves 543 in the coupling tube 54.

Figure 7:
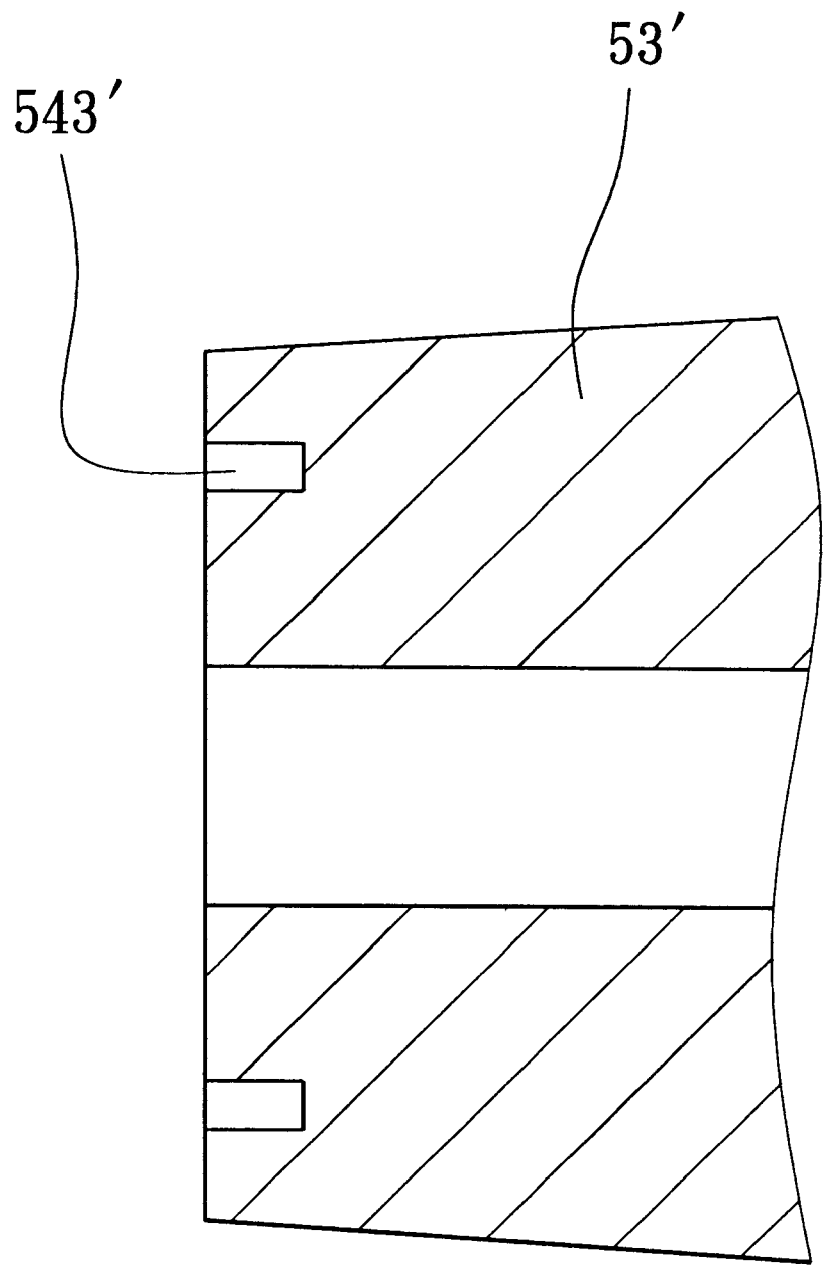
FIG. 7 is a sectional view, illustrating a modified sleeve unit of the fishing reel of this invention.

Note that the sleeve 53 and the coupling tube 54 may be formed integrally with each other to constitute a unitary sleeve unit 53' (see FIG. 7), which is formed with six grooves 543' (see FIG. 7).

With this invention thus explained, it is apparent that numerous modifications and variations can be made without departing the scope and spirit of this invention. It is therefore intended that this invention be limited only as indicated by the appended claims.

I claim:

1. A fishing reel comprising:

a reel body;

a main shaft journalled in said body;

a driving tube journalled in said body and extending perpendicular to said main shaft, said driving tube having a polygonal-cross-sectioned hole;

means for transferring rotation of said driving tube to said main shaft;

a spool rotatable by said main shaft; and a swing arm device including a swing arm, and a driving shaft having a polygonal-cross-sectioned shaft portion that engages fittingly said polygonal-cross-sectioned hole in said driving tube so as to permit synchronous rotation of said driving shaft and said driving tube, and an outer end that is attached to said swing arm;

said driving tube further having an outer end that is formed with a plurality of angularly equidistant tongues, said reel further including a sleeve unit which is journalled in said body and which is disposed around said driving shaft, said sleeve unit having an outer end which is connected to said swing arm in such a manner to permit synchronous rotation with said swing arm when said swing arm rotates about said driving shaft, and an inner end surface which is formed with a plurality of angularly equidistant grooves that engage respectively and fittingly said tongues of said driving tube, thereby permitting synchronous rotation of said driving tube and said sleeve unit.

2. The fishing reel as claimed in claim 1, wherein said sleeve unit includes:

a sleeve journalled on said body and having an inner end adjacent to said driving tube, and an outer end coupled with said swing arm; and a coupling tube secured within said inner end of said sleeve and having an inner end surface that is formed with said grooves.

3. The fishing reel as claimed in claim 2, wherein said coupling tube has an outer end surface which is formed with two diametrically opposed projections, said sleeve having an inner end surface which is formed with a recess unit, said coupling tube being received within and being complementary to said recess unit in said sleeve so as to clamp said coupling tube between said sleeve and said driving tube, thereby preventing relative rotation between said sleeve and said coupling tube.

4. The fishing reel as claimed in claim 2, wherein said body includes a left housing and a right housing that is connected removably to said left housing, said driving tube being disposed between said left and right housings, said right housing having an outwardly extending integral support tube that is constructed as a truncated cone and that is received fittingly within said inner end of said sleeve, said support tube having an inner end that is formed integrally on said right housing, an outer end, and an outer diameter that reduces gradually from said inner end of said support tube to said outer end of said support tube, said driving shaft extending through said sleeve, said coupling tube, said support tube, said right housing, said driving tube, and said left housing and having an inner end surface, which is formed with a threaded hole, said reel further including a bolt which engages said threaded hole in said driving shaft and which has a fixed rotary knob that abuts against said left housing so as to retain said driving shaft on said body.

5. The fishing reel as claimed in claim 4, wherein said sleeve has an outer end surface, which has a central hole for extension of said driving shaft, and two diametrically opposed integral projections that are located on two sides of said central hole in said sleeve, said swing arm having an end, which is formed with a slot, within which an assembly of said outer end of said driving shaft and said projections of said sleeve is received fittingly so as to rotate said sleeve synchronously with said swing arm when said swing arm rotates about said driving shaft, said reel further including a pivot pin extending through said end of said swing arm and said outer end of said driving shaft so that said swing arm can be rotated about said pivot pin to a folded position when said bolt is somewhat loosened from said driving shaft to permit movement of said driving shaft relative to said body.

* * * * *